(12) United States Patent
Peng et al.

(10) Patent No.: US 10,081,066 B2
(45) Date of Patent: Sep. 25, 2018

(54) SELF-LOCKING HEAD-REPLACEABLE CARBIDE DRILL

(71) Applicant: CHENGDU FENGYI PRECISION TOOLS MANUFACTURE CO., LTD, Chengdu (CN)

(72) Inventors: Lugui Peng, Chenghua (CN); Hao Peng, Chenghua (CN)

(73) Assignee: CHENGDU FENGYI PRECISION TOOLS MANUFACTURE CO., LTD, Chengdu (CN)

( * ) Notice: Subject to any disclaimer, the term of this patent is extended or adjusted under 35 U.S.C. 154(b) by 212 days.

(21) Appl. No.: 15/134,018

(22) Filed: Apr. 20, 2016

(65) Prior Publication Data

US 2016/0311035 A1 Oct. 27, 2016

(30) Foreign Application Priority Data

Apr. 21, 2015 (CN) .......................... 2015 1 0190598

(51) Int. Cl.
*B23B 51/02* (2006.01)

(52) U.S. Cl.
CPC .......... *B23B 51/02* (2013.01); *B23B 2205/02* (2013.01); *B23B 2222/28* (2013.01); *B23B 2222/84* (2013.01); *B23B 2251/02* (2013.01); *B23B 2251/043* (2013.01); *Y10T 408/90987* (2015.01)

(58) Field of Classification Search
CPC . B23B 51/02; B23B 2205/02; B23B 2251/02; Y10T 408/9098; Y10T 408/90987
See application file for complete search history.

(56) References Cited

U.S. PATENT DOCUMENTS

| | | | |
|---|---|---|---|
| 5,957,631 A | 9/1999 | Hecht | |
| 6,840,717 B2 * | 1/2005 | Eriksson | B23B 51/02 408/1 R |
| 7,306,410 B2 | 12/2007 | Borschert et al. | |
| 7,407,350 B2 * | 8/2008 | Hecht | B23B 51/02 407/34 |
| 7,625,161 B1 * | 12/2009 | Ruy Frota de Souza | B23B 51/02 407/113 |
| 8,092,126 B2 * | 1/2012 | Tanaka | B23B 51/02 408/230 |

(Continued)

FOREIGN PATENT DOCUMENTS

CN ZL200580037359.5 10/2007
WO WO 2010105608 A1 * 9/2010 ............. B23B 51/02

*Primary Examiner* — Eric A Gates
(74) *Attorney, Agent, or Firm* — JCIPRNET (57) ABSTRACT

A self-locking head-replaceable carbide drill, comprising a cutter head disposed at the upper end of a cutter shank. A cylinder is disposed at the lower part of the cutter head, a vertical cylinder holding slot or cylinder handle holding hole is disposed at the upper end of the cutter bar, at least two cutter head notches are disposed on the drilling body of the cutter head, and each cutter head notch is formed by intersecting a first and a second cutter head contact face. At least two upward protrusions disposed on the wall of the upper end of the cutter bar and have the same number as the cutter head notches. When assembling the cutter head and the cutter shank, the cutter head ridge edges and the inner surfaces of the protrusions are in non-contact fit, interference fit and non-interference fit in sequence.

18 Claims, 13 Drawing Sheets

(56) References Cited

U.S. PATENT DOCUMENTS

| | | | | |
|---|---|---|---|---|
| 8,142,116 B2* | 3/2012 | Frejd | ............... | B23B 51/02 |
| | | | | 408/226 |
| 8,430,609 B2* | 4/2013 | Frejd | ............... | B23B 51/02 |
| | | | | 408/226 |
| 8,721,235 B2* | 5/2014 | Kretzschmann | ........ | B23B 51/02 |
| | | | | 408/144 |
| 8,784,018 B2* | 7/2014 | Päbel | ............... | B23B 51/02 |
| | | | | 408/230 |
| 8,784,019 B2* | 7/2014 | Pabel | ............... | B23B 51/02 |
| | | | | 408/227 |
| 8,840,347 B2* | 9/2014 | Aare | ............... | B23B 51/02 |
| | | | | 408/230 |
| 8,931,982 B2* | 1/2015 | Osawa | ............... | B23B 51/02 |
| | | | | 408/226 |
| 8,992,143 B2* | 3/2015 | Glimpel | ............... | B23B 51/02 |
| | | | | 408/226 |
| 9,073,128 B2* | 7/2015 | Mack | ............... | B23B 51/02 |
| 9,296,049 B2* | 3/2016 | Schwaegerl | ............ | B23B 51/00 |
| 9,555,484 B2* | 1/2017 | Koga | ............... | B23B 51/02 |
| 2009/0116920 A1* | 5/2009 | Bae | ............... | B23B 51/02 |
| | | | | 408/227 |
| 2012/0009034 A1* | 1/2012 | Mack | ............... | B23B 51/02 |
| | | | | 408/226 |
| 2012/0315101 A1* | 12/2012 | Osawa | ............... | B23B 51/02 |
| | | | | 408/226 |
| 2015/0104266 A1* | 4/2015 | Guter | ............... | B23B 51/02 |
| | | | | 408/230 |
| 2016/0263664 A1* | 9/2016 | Son | ............... | B23B 51/02 |

\* cited by examiner

SELF-LOCKING HEAD-REPLACEABLE CARBIDE DRILL

CROSS REFERENCE TO RELATED APPLICATION

The present application claims priority to Chinese patent application Serial No. 201510190598.X, filed Apr. 21, 2015, the content of which is hereby incorporated by reference in its entirety.

TECHNICAL FIELD

The present invention relates to a carbide drill, in particular to a self-locking head-replaceable carbide drill which has the self-locking function and is convenient for drill head replacement.

BACKGROUND

The history of learning and using drills can be traced back to prehistoric times. Stone drills are used by Shuiren Shi for drilling wood to make fire, which is regards as the origin of drills. In modern industry, the twist drills, commonly known as drills, are widely used, which are a hole-machining tool with complicated shape and invented more than a hundred years ago. At present, billions of drills of different types are used across the world. It is reported that the hole-drilling procedure accounts for about a half of the whole making process in America's automobile industry, even higher in aircraft industry. Drilling operation belongs to the field of bore machining, and the hole-making operation is one of the most complicated operations in making process. That's why people have been working on the improvement of drills and drilling procedures.

A head-replaceable carbide modular drill comprises a carbide drill head and a steel tool holder, the head being mounted on the tool holder. For a certain range of hole diameter, the head-replaceable carbide modular drill can fully replace the conventional common-used solid carbide drill. The head-replaceable carbide drill is featured that the drill head can be replaced and the tool holder can be repeatedly used. The consumption of carbide material used for head-replaceable carbide drill heads is far less than that of solid carbide drills, thereby greatly reducing the cost of hole-machining tools.

China patent ZL 200580037359.5 discloses a rotary cutting tool comprising a solid cutter head detachably fixed on a shank portion, the cutter head has a cutting part which is close to the front face of the cutter head and a mounting part which integrates with the cutting part and extends backward from the middle of the cutter head, the shank portion has a receiving part extending from the front face of the shank portion, when the cutter head is fixed to the shank portion, the mounting part is accommodated in the receiving part and the front face of the shank portion protrudes forward and approaches towards the front face of the cutter head.

In an exemplary embodiment of American patent U.S. Pat. No. 7,306,410, the clamping and fixing screw which is screwed in from the circumference of the cylindrical shank extends through the fixing column and the clamping extension portion for clamping the screw in place, the clamping and fixing screw not only provides a definitive fit-connection between the clamping extension portion and the fixing column but also increase the clamping pressure which is applied by clamping extension portion to the frusto-conical surface of the support in the radial direction. In another exemplary embodiment of this patent, the clamping and fixing screw is disposed inside the slot opening in a way that the rotation axis thereof extends along the diameter direction, and the slot opening extends inside the fixing column in the radial direction and is open towards the gradually-tapered end of the fixing column. When the replaceable cutter head is fixed onto the cylindrical shank, extra complexity and longer assembly time are added to the need of the clamping and fixing screw.

American patent U.S. Pat. No. 5,957,631 discloses a rotary cutting tool comprising a cutter head detachably connected to a shank portion, the cutter head and the shank portion are assembled by fitting the shape and size of the circumferential surfaces of the cutter head and the shank portion, a cutting edge is disposed at the front end of the cutter head, the cutter head and the bar portion are advantageously connected by a dovetail-shaped junction configuration to provide firm retention and stable connection, without depending on screws or other connectors. This greatly simplifies the assembly and disassembly of cutter head and shank portion.

The head-replaceable drills in the above patents have cutter head-replaceable function, however, the replacement of cutter head should be implemented by interference fit or screw fastening, in addition, the cutter head and cutter shank have fastening function alone, lacking self-locking function, interference fit fixation leads to strict requirement and big difficulty in manufacture, screw fixation is inconvenient, and both of them lack self-locking fixation function which is simple and easy for assembly/disassembly.

SUMMARY OF THE INVENTION

In order to solve the above problems, an objective of the present invention is to provide a self-locking head-replaceable carbide drill which has a simple structure, is convenient for fabrication, works stably and reliably with high positioning accuracy, and has a self-locking function.

The objective of the present invention is achieved by the following technical solutions:

A self-locking head-replaceable carbide drill, comprises a cutter head and a cutter shank, in the view of the cutter head tip being upward, the upper part of the cutter head comprises a drill tip and a drilling body positioned below the drill tip, the cutter head is disposed at the upper side of the cutter shank, a cylinder is disposed at the lower part of the cutter head, the outer diameter of the drilling body of the cutter head is larger than that of the cylinder, a cylinder holding slot or cylinder holding hole is disposed at the upper end of the cutter shank, the cylinder is mounted in the cylinder holding slot or cylinder holding hole, at least two cutter head notches are formed on the drilling body of the cutter head, each of the cutter head notches is formed by intersecting a first cutter head contact face and a second cutter head contact face, which are vertical or vertically oblique, the first cutter head contact faces are more close to the vertical central line of the drilling body of the cutter head than the second cutter head contact faces, the side edge of each first cutter head contact face distal to the corresponding second cutter head contact face is bended towards the vertical central line of the drilling body of the cutter head to form a cutter head ridge edge, the distance between each cutter head ridge edge and the vertical central line of the drilling body of the cutter head is greater than the radial sectional radius of the cylindrical handle, a vertical line segment exists in each first cutter head contact face, and the distance between the vertical line segment and the vertical central line of the drilling body of the cutter head is shortest among all of the distances between the first cutter head contact faces and the vertical central line of the drilling body of the cutter head, at least two protrusions which protrude upward are disposed on the upper side faces of the cutter shank and have the same number as the cutter head notches, the inner surfaces of the protrusions are positioned on the outer side of the wall of the cylinder holding slot or cylinder holding hole, the protrusions have such a structure that during the process of assembling the cutter head and the cutter shank, the cutter head ridge edges are sequentially in non-contact fit, interference fit and non-interference fit with the inner surfaces of the protrusions, and after the assembly is completed, the first cutter head contact faces are in close contact with the inner surfaces of the protrusions, and the second cutter head contact faces are in close contact with the first lateral surfaces of the protrusions.

In this structure, the most important technical solution is that the cutter head ridge edges and the inner surfaces of the protrusions are sequentially in non-contact fit, interference fit and non-interference fit during the assembly process, correspondingly, this effect is determined by the relative positional relation between the first cutter head contact faces and the cutter head ridge edges and the vertical central line of the drilling body and the relative position and distance between the protrusions, as well as the positional relation between the first cutter head contact faces and the inner surfaces of the protrusions and the positional relation between the second cutter head contact faces and the first lateral surfaces of the protrusions, such a structure can ensure self-locking, tight and stable assembly between the cutter head and the cutter shank and the transfer of vertical drilling force and torsion.

Preferably, the cutter head notches are two and symmetrically to each other relative to the vertical central line of the drilling body, the protrusions are two and symmetrically to each other relative to the vertical central line of the cutter shank, both the first cutter head contact faces and the second cutter head contact faces are a plane, both the inner surfaces and the first lateral surfaces of the protrusions are a plane, and the distance between the two cutter head ridge edges is slightly greater than the shortest distance between the inner surfaces of the two protrusions. This structure is simplified to reduce the machining cost while ensuring the effect as much as possible. The first cutter head contact faces, the second cutter head contact faces and the inner surfaces and first lateral surfaces of the protrusions may be arc-shaped, but it is not preferred because the machining precision and machining cost of arc-shaped faces are higher. In the case of two protrusions, one of the specific preferred structures for realizing the assembly between the cutter head ridge edges and the inner surfaces of the two protrusions is that the distance between the two cutter head ridge edges is slightly greater than the shortest distance between the inner surfaces of the two protrusions, which is not always suitable for the case of more than two protrusions.

Preferably, the included angle between each second cutter head contact face and the horizontal direction is 45°-90°, the upper part of each second cutter head contact face is more distal to the vertical central line of the drilling body of the cutter head than the lower part, and the included angle between each first lateral surface of the protrusions and the horizontal direction is 45°-90°. In this structure, the first lateral surfaces of the protrusions receive the drilling torque from the second cutter head contact surfaces during the cutting process of the drill, the upper side surfaces of the cutter shank is in close contact with the bottom of the drilling body of the cutter head when the drill is in self-locking state after assembly, and the side surfaces of the cutter shank receive the vertical drilling force from the bottom of the drilling body.

More preferably, the included angle between each second cutter head contact face and the horizontal direction is 65°, and the included angle between each first lateral surface of the protrusions and the horizontal direction is 65°.

In order to ensure smooth transition and wear reduction of the cutter head ridge edges on the inner surfaces of the protrusions, and the cutter head ridge edges are arc-shaped.

In order to facilitate the loading/unloading of the cutter head, two loading/unloading clamp slots for mounting a loading/unloading tool are disposed on the upper margin of the drilling body of the cutter head and in the position beside the two cutter head notches.

Preferably, the included angle between the bottom of the loading/unloading clamp slots and the horizontal direction is 60°.

Preferably, the drill point angle of the drill tip at the top of the cutter head is 140°.

In order to facilitate the removal of chips, spiral chip flutes are formed on both the cutter head and the cutter shank and communicate with each other.

Preferably, the spiral angle of the chip flutes is 25°.

The present invention has the advantages as follows:

According to the present invention, the first cutter head contact surfaces and second cutter head contact surfaces are disposed on the drilling body of the cutter head, the cutter head ridge edges are disposed on one side of the first cutter head contact surfaces, and the protrusions are disposed on the cutter shank, so that during the assembly process, the cutter head ridge edges are sequentially in non-contact fit, interference fit and non-interference fit with the inner surfaces of the protrusions, and after assembly, the first cutter head contact surfaces are in close contact with the inner surfaces of the protrusions and the vertically-oblique second cutter head contact surfaces are in close contact with the first lateral surfaces of the protrusions which are also vertically oblique at the same angle as the second cutter head contact surfaces, thereby realizing the self-locking function between the cutter head and the cutter shank and ensuring stable connection and reliable transmission of the cutter head and the cutter shank, in addition, the assembly/disassembly is very convenient and rapid without needing screws for fastening. The drilling torque applied to the cutter head is transferred to the cutter shank via the second cutter head contact surfaces, so that the fitting between the second contact surfaces of the cutter head and the first lateral surfaces of the protrusions and the fitting between the lower end surface of the drilling body of the cutter head and the upper end surfaces of the cutter shank are more tight during work of the cutter head and the cutter shank, thereby further realizing the self-locking function and ensuring high speed, high precision and less jump of the drill bit during the drilling process. The self-locking head-replaceable carbide drill of the present invention has unique self-locking function and the characteristics of simple structure, high reliability and high precision, has the advantages of high efficiency, high precision, low cost, rapid cutter head replacement, low cutting force, smooth chip removal and smooth cutting process, and is widely applied to the high-speed high-feed machining of different types of holes.

DETAILED DESCRIPTION OF THE PREFERRED EMBODIMENTS

The present invention will be further illustrated in combination with the following accompanying drawings.

Figure 1:
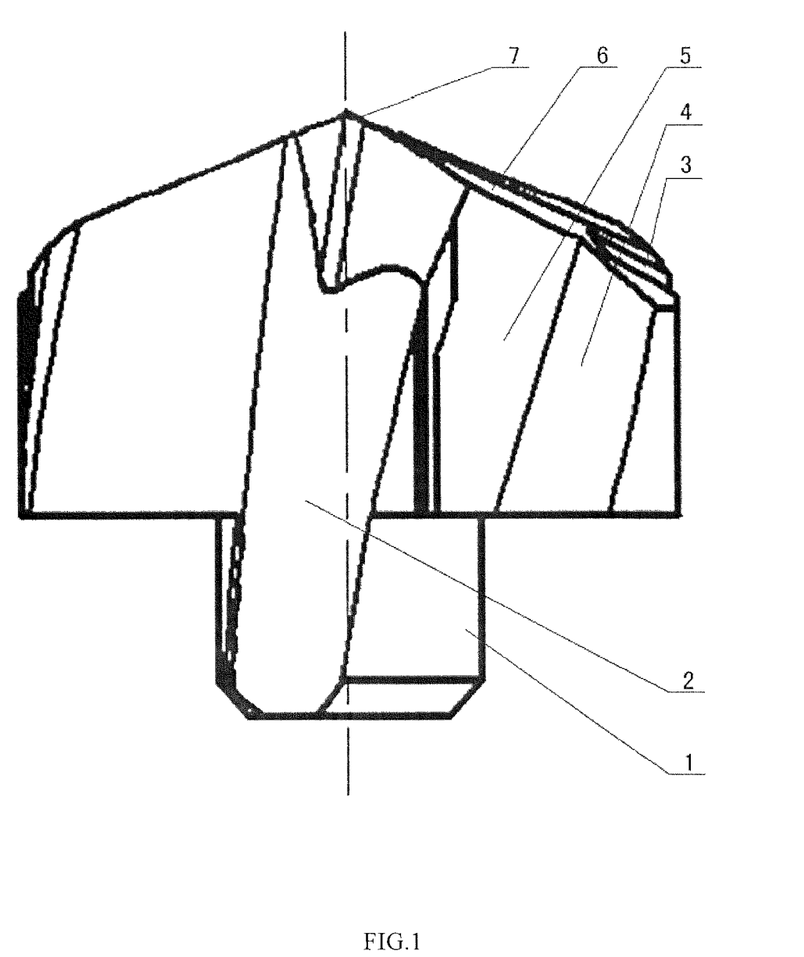
FIG. 1 is front view of a cutter head of the self-locking head-replaceable carbide drill of the present invention.
Figure 2:
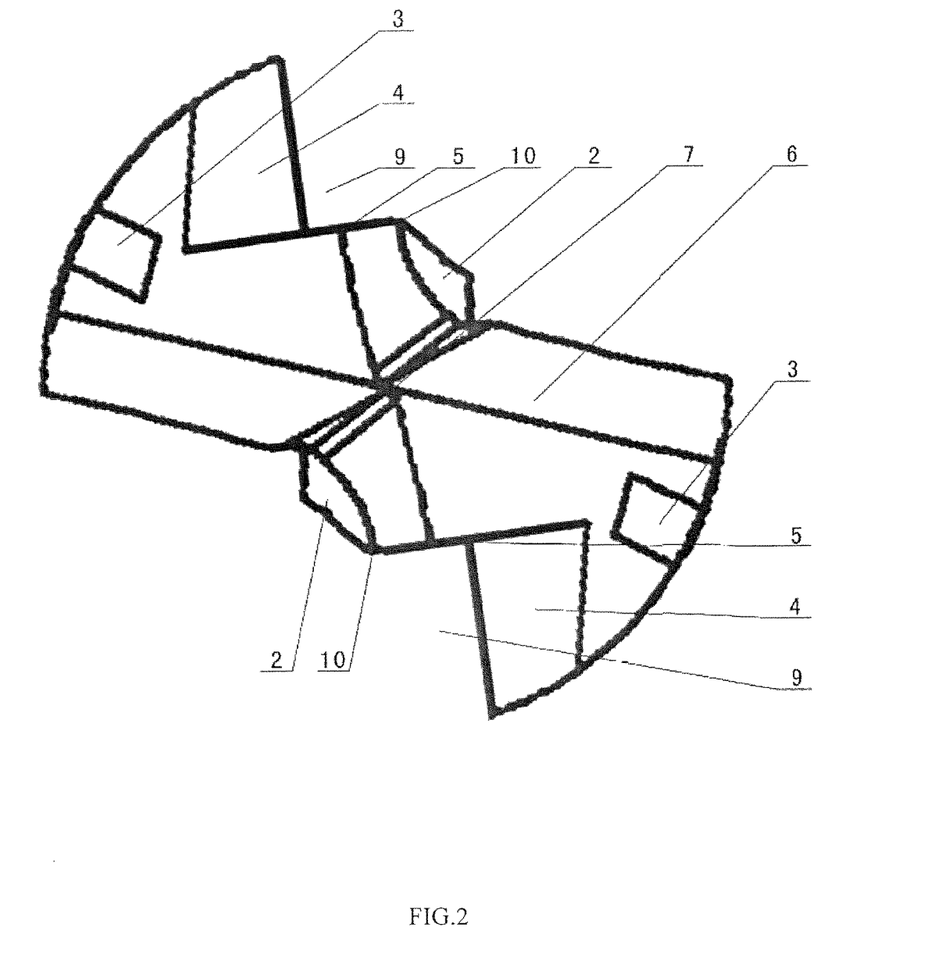
FIG. 2 is a top view of a cutter head of the self-locking head-replaceable carbide drill of the present invention.
Figure 3:
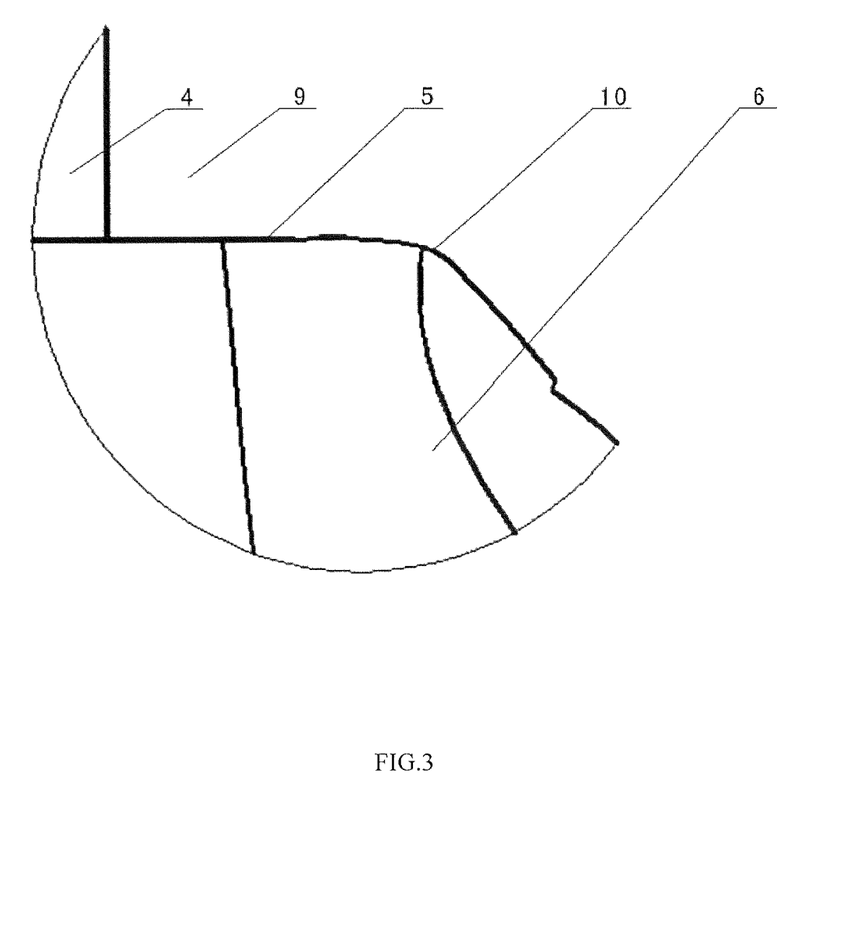
FIG. 3 is a partially enlarged view of a structure of the cutter head ridge edges of the present invention, with the same view angle as FIG. 2.
Figure 4:
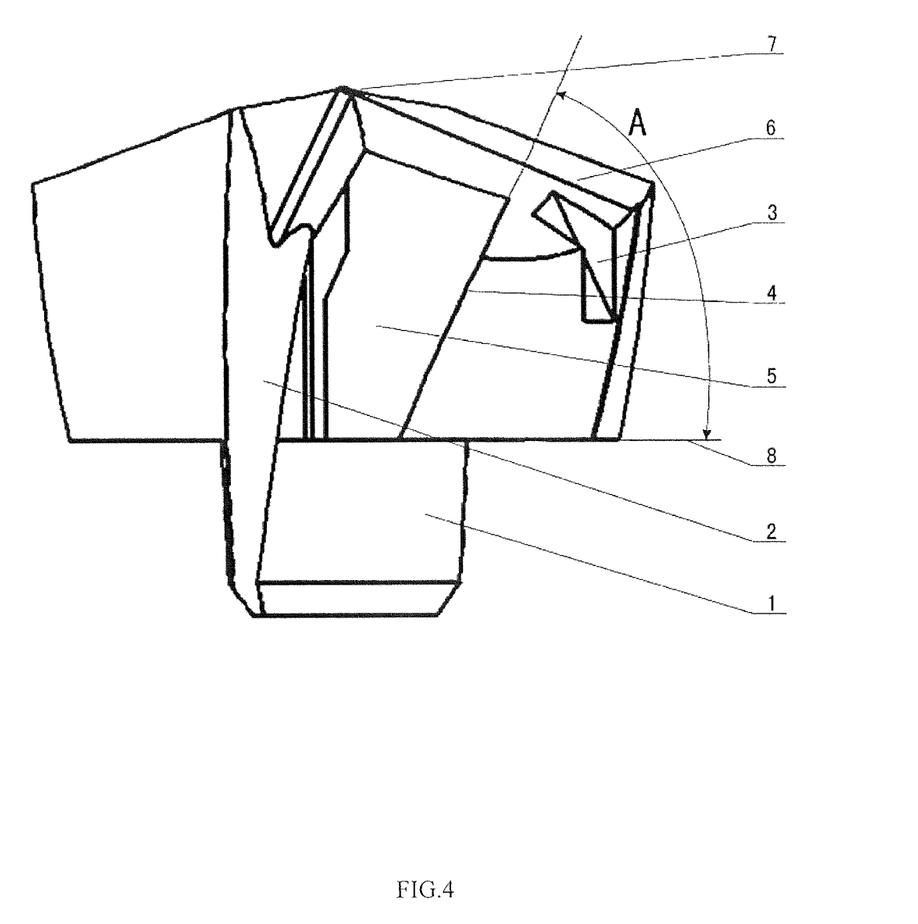
FIG. 4 is an approximately front view of a cutter head of the self-locking head-replaceable carbide drill of the present invention, with slightly different view angle from FIG. 1.
Figure 5:
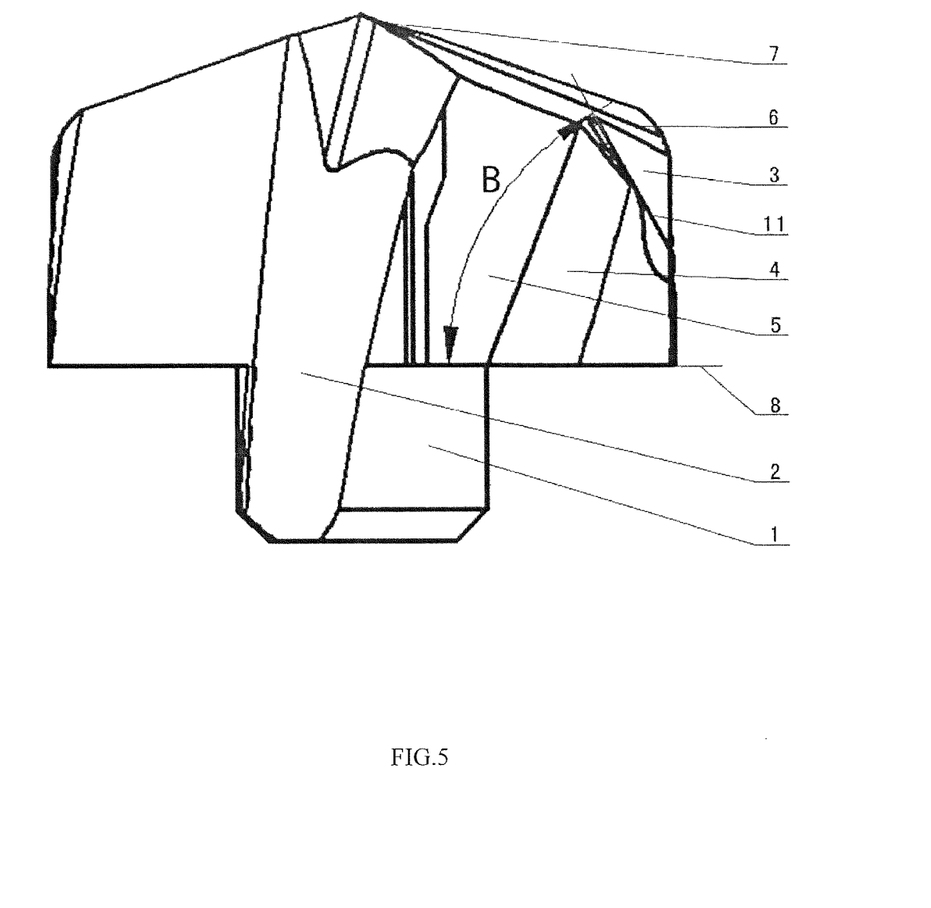
FIG. 5 is another approximately front view of a cutter head of the self-locking head-replaceable carbide drill of the present invention, with slightly different view angle from FIG. 1.
Figure 6:
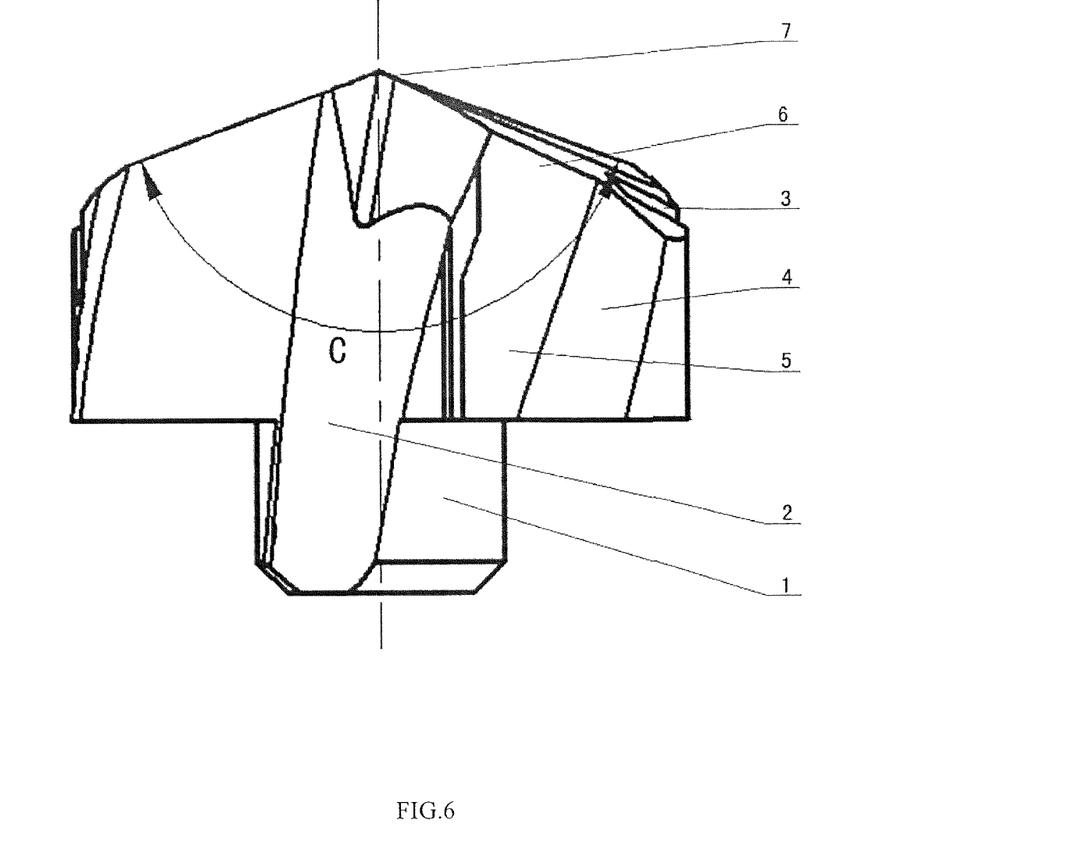
FIG. 6 is still another approximately front view of a cutter head of the self-locking head-replaceable carbide drill of the present invention, with the substantially same view angle as FIG. 1.
Figure 7:
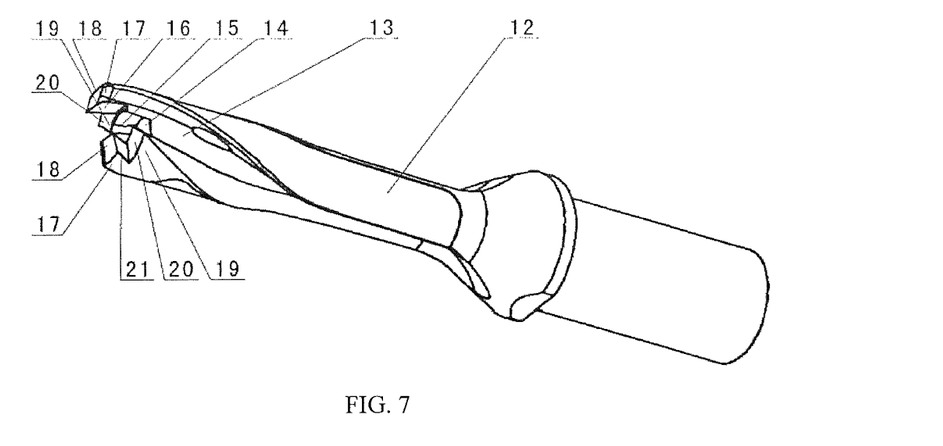
FIG. 7 is a perspective view of a cutter bar of the self-locking head-replaceable carbide drill of the present invention.
Figure 8:
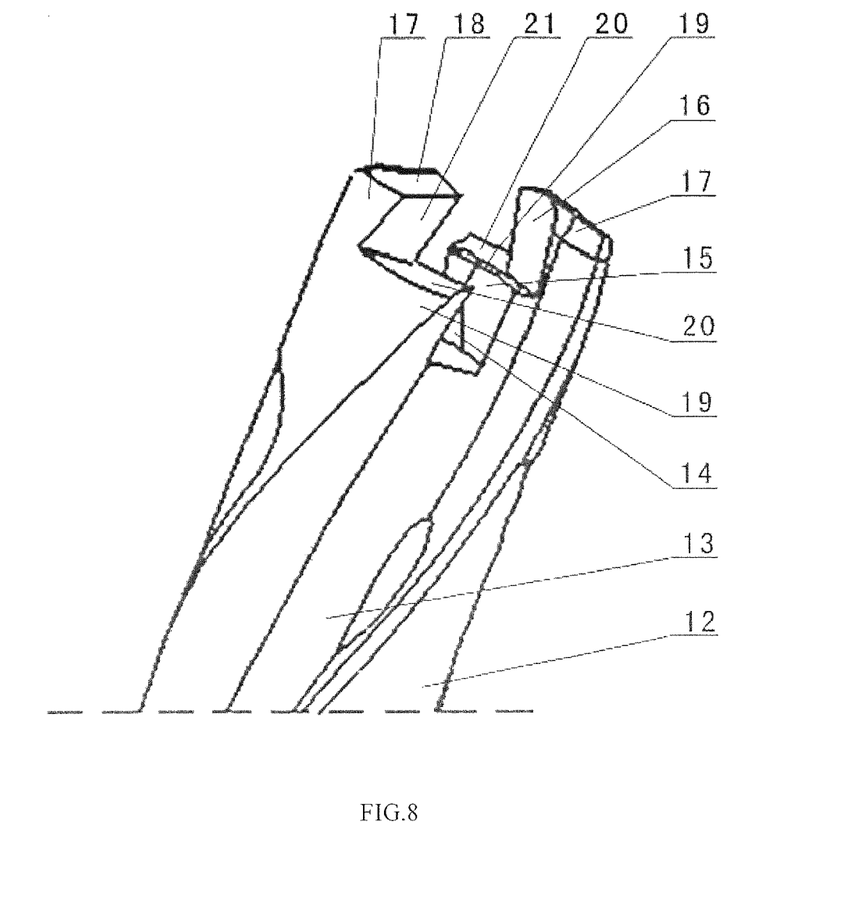
FIG. 8 is a perspective enlarged view of the upper part of a cutter bar upper part of the self-locking head-replaceable carbide drill of the present invention.
Figure 9:
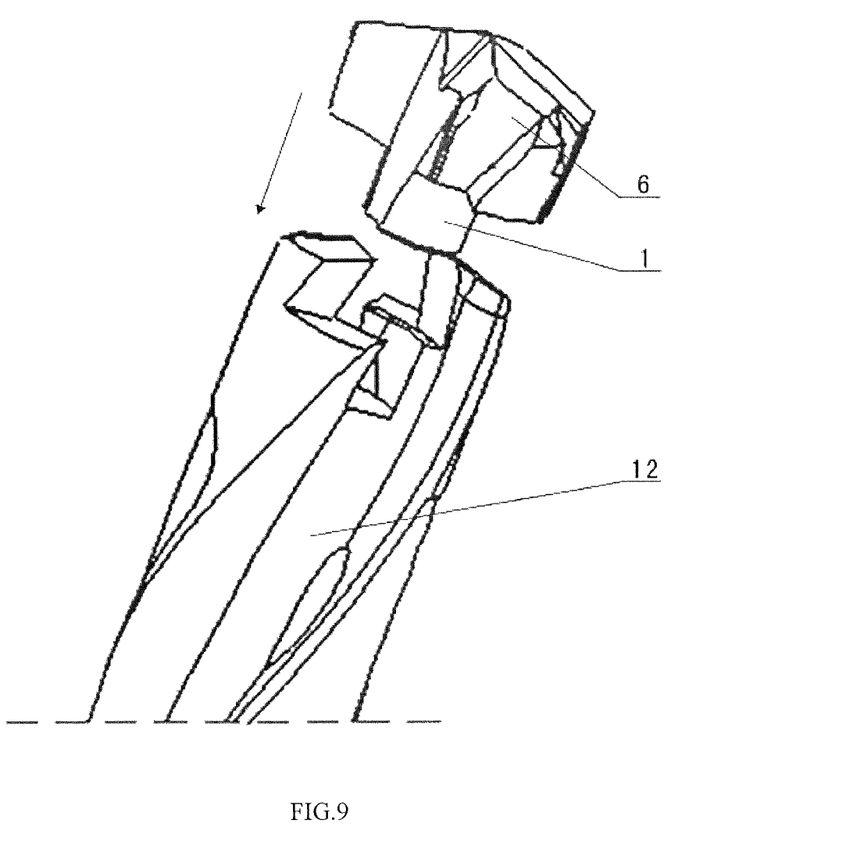
FIG. 9 is a perspective view of an upper-part assembly of cutter head and cutter shank of the self-locking head-replaceable carbide drill of the present invention.
Figure 10:
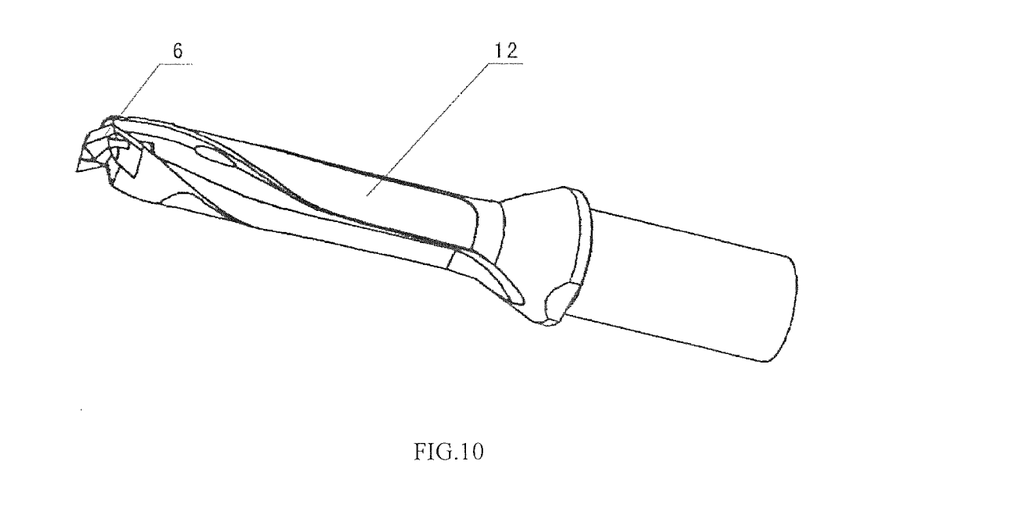
FIG. 10 is a perspective view of an assembly of cutter head and cutter shank of the self-locking head-replaceable carbide drill of the present invention.
Figure 11:
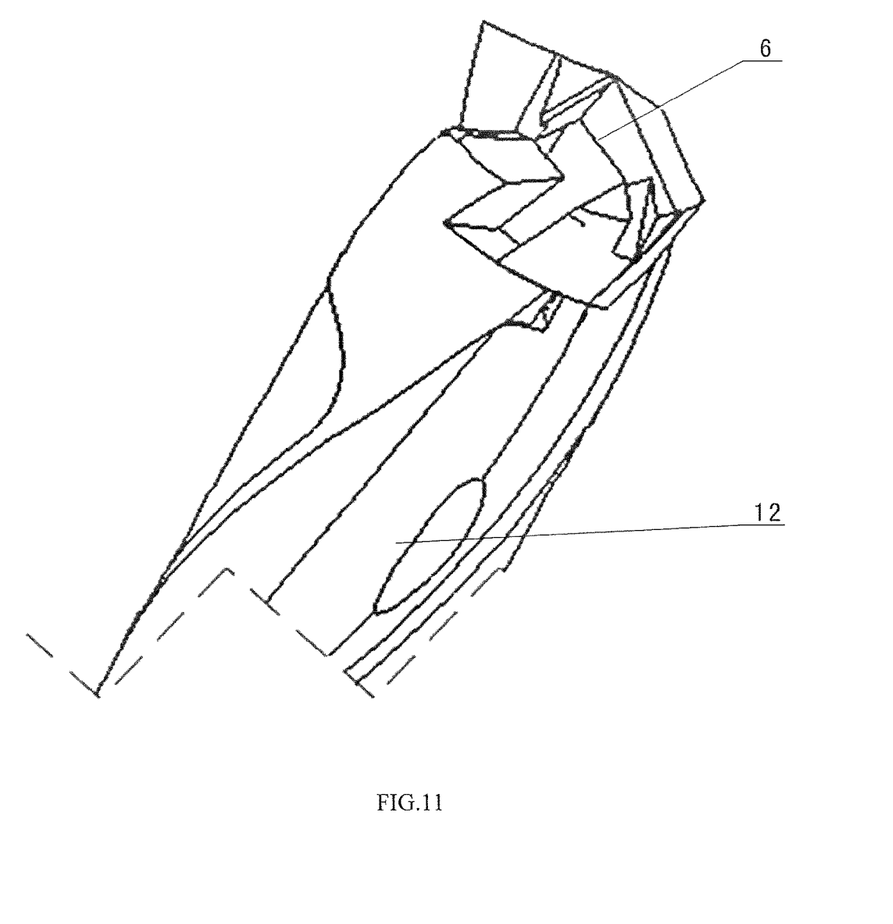
FIG. 11 is a perspective enlarged view of an upper-part assembly of cutter head and cutter shank of the self-locking head-replaceable carbide drill of the present invention.

As shown in FIG. 1 to FIG. 11, the self-locking head-replaceable carbide drill of the present invention comprises a cutter head (6) and a cutter shank (12), in the view of the cutter head tip being upward, the upper part of the cutter head (6) comprises a drill tip (7) and a drilling body (not numbered in the figures) positioned below the drill tip (7), the drill point angle C of the drill tip (7) at the upper part of the cutter head (6) is 140°, the cutter head (6) is disposed at the upper end of the cutter shank (12), a cylinder (1) is arranged at the lower part of the cutter head (6), the outer diameter of the drilling body of the cutter head (6) is larger than that of the cylinder (1), a cylinder holding slot (14) is disposed at the upper end faces (20) of the cutter shank (12), the cylinder holding slot (14) is defined by the inner surface (15) of two upper end parts (19) of the cutter bar (12), the cylindrical handle holding slot (14) may be replaced by a cylindrical handle holding hole, the cylindrical handle (1) is mounted in the cylindrical handle holding slot (14), two cutter head notches (9) are formed on the drilling body of the cutter head (6) in a way of being symmetrical to each other relative to the vertical central line of the drilling body of the cutter head (6), each of the cutter head notches (9) is formed by intersecting a first cutter head contact face (5) which is vertical or vertically oblique (not preferably) and a second cutter head contact face (4) which is vertically oblique or vertical (not preferably), both the first cutter head contact faces (5) and the second cutter head contact faces (4) are a plane, the included angle A between each second cutter head contact face (4) and the horizontal direction (i.e. reference horizontal line (8)) is 65°, correspondingly, the included angle between the first lateral surface (21) of each protrusion (17) and the horizontal direction (i.e. reference horizontal line (8)) ranges from 45° to 90° and preferably equal to the included angle A, the included angle A may be another value in the range of 45° to 90°, the upper part of each second cutter head contact face (4) is more distal to the vertical central line of the drilling body of the cutter head (6) than the lower part, the first cutter head contact faces (5) are more close to the vertical central line of the drilling body of the cutter head (6) than the second cutter head contact faces (4), the side edge of each first cutter head contact face (5) distal to the corresponding second cutter head contact face (4) is bended towards the vertical central line of the drilling body of the cutter head (6) to form a cutter head ridge edge (10), the cutter head ridge edges (10) are arched edges, the distance between each cutter head ridge edge (10) and the vertical central line of the drilling body of the cutter head (6) is greater than the radial sectional radius of the cylinder (1), a vertical line segment (not indicated in the figures) exists in each first cutter head contact face (5), and the distance between the vertical line segment and the vertical central line of the drilling body of the cutter head (6) is shortest among all of the distances between the first cutter head contact faces (5) and the vertical central line of the drilling body of the cutter head (6), two protrusions which protrude upward are disposed on the wall of the upper end parts (19) of the cutter shank (12) and symmetrical to each other relative to the vertical central line of the cutter shank (12), both the inner surface (16) and the first side surface (21) of each protrusion (17) are a plane, the inner surfaces (16) of the protrusions (17) are positioned on the outer side of the wall of the cylinder holding slot (14), and the distance between the two cutter head ridge edges (10) is slightly greater than the shortest distance between the inner surfaces (16) of the two protrusions (17); during the process of assembling the cutter head (6) and the cutter shank (12), the cutter head ridge edges (10) (or lower section or middle-lower section thereof) are sequentially in non-contact fit, interference fit and non-interference fit with the inner surfaces (16) of the two protrusions (17); and after the assembly is completed, the first cutter head contact faces (5) are in close contact with the inner surfaces (16) of the protrusions (17), and the second cutter head contact faces (4) are in close contact with the first lateral surfaces (21) of the protrusions (17). The included angle between the first cutter head contact face (5) and the second cutter head contact face (4) can be changed according to the actual needs, generally in the range of 60° to 90°, preferably 90°. Two loading/unloading clamp slots (3) are disposed at the upper edge of the drilling body of the cutter head (6) in the position beside the two cutter head notches (9) and used for mounting a loading/unloading tool, and the included angle B between the bottom surface of each clamp slot (3) and the horizontal direction (i.e. reference horizontal line (8)) is 60°. Spiral chip flutes (2) are disposed on the cutter head (6), a spiral chip flute (13) is disposed on the cutter shank (12), the spiral chip flutes (2) and the spiral chip flute (13) communicate to each other and both have the spiral angle of 25°. In FIG. 7 and FIG. 8, the top surfaces (18) of the protrusions (17) are depicted, in which the height of the top surfaces (18) of the protrusions (17) is variable but needs to meet the fitting requirement of the protrusions (17) and the first cutter head contact faces (5). The top surfaces of the upper end parts (19) of the cutter shank (12) define upper end surfaces (20), and the upper end surfaces (20) are in close contact with the lower end surface of the drilling body of the cutter head (6) after the drill bit is assembled.

Figure 12:
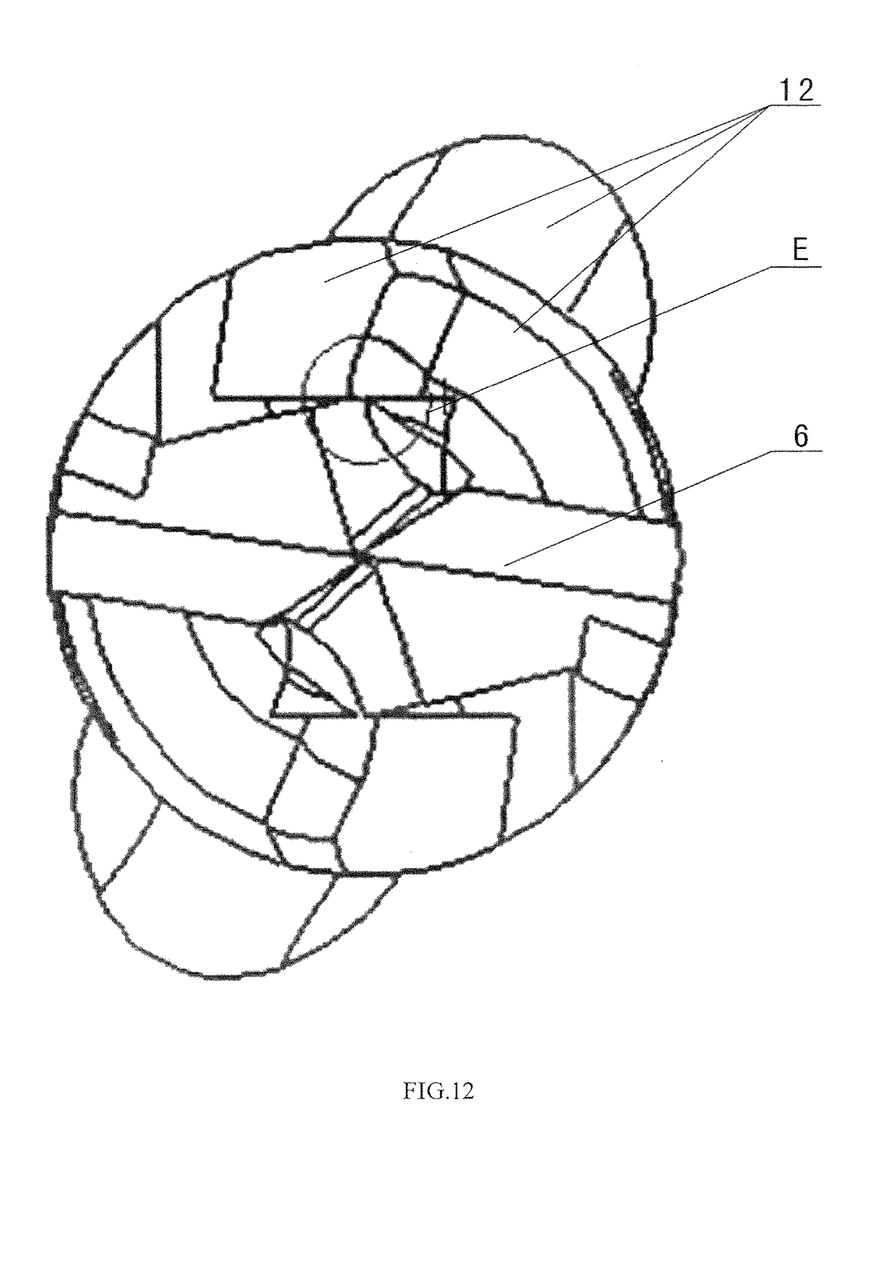
FIG. 12 is a top view of interference fit of cutter head and cutter shank of the self-locking head-replaceable carbide drill of the present invention during assembly.
Figure 13:
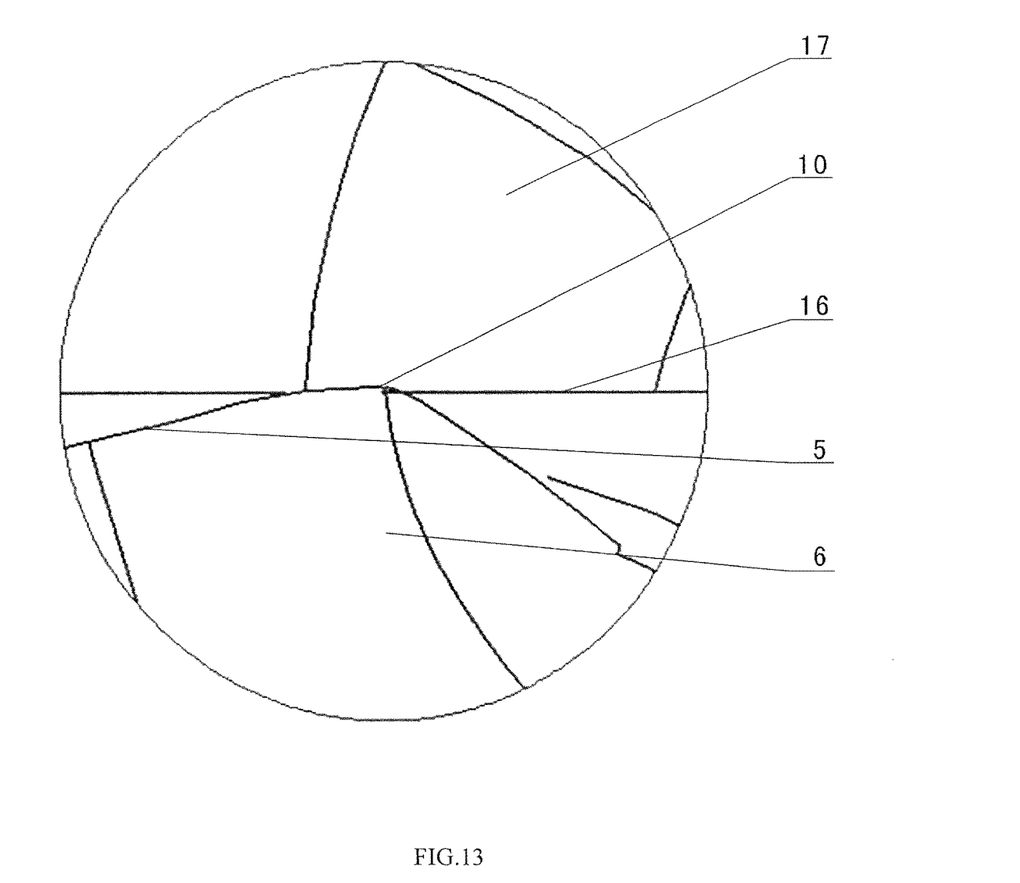
FIG. 13 is an enlarged view of 'E' in FIG. 12.
Figure 14:
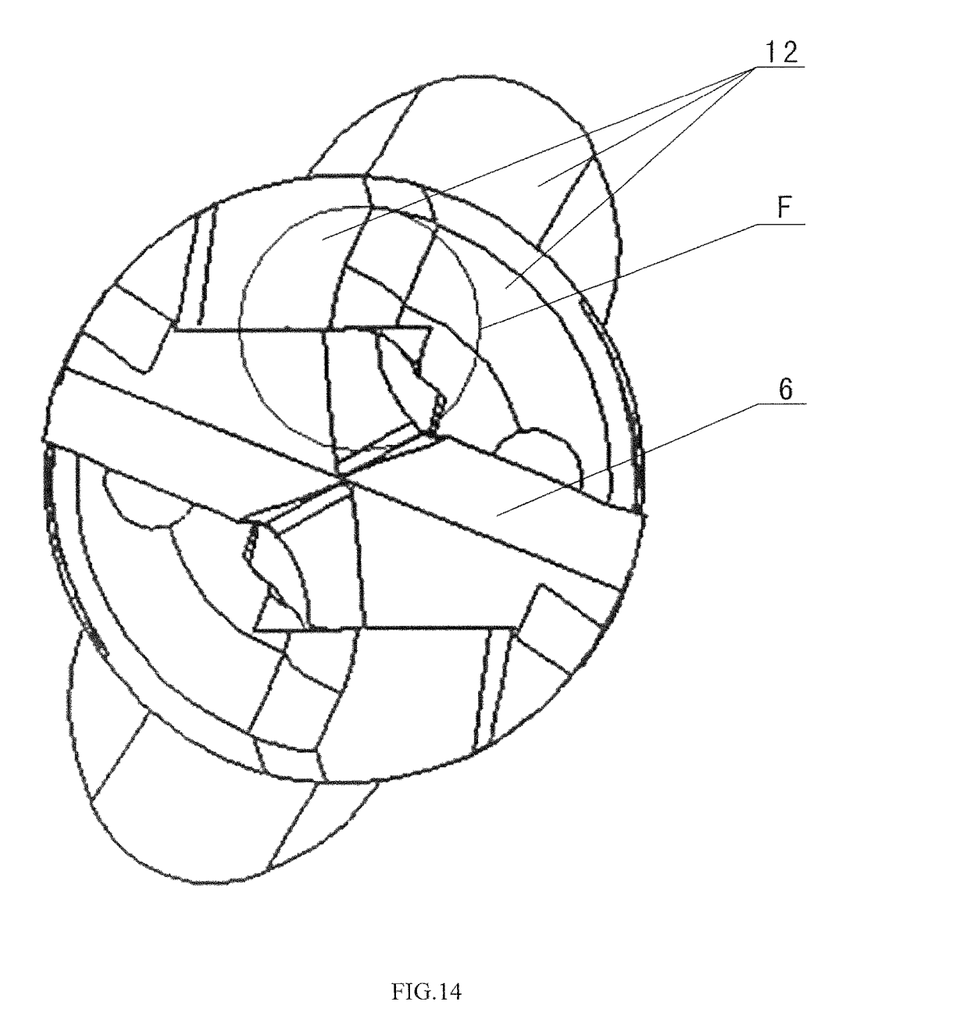
FIG. 14 is a top view of an assembly of cutter head and cutter shank of the self-locking head-replaceable carbide drill of the present invention.
Figure 15:
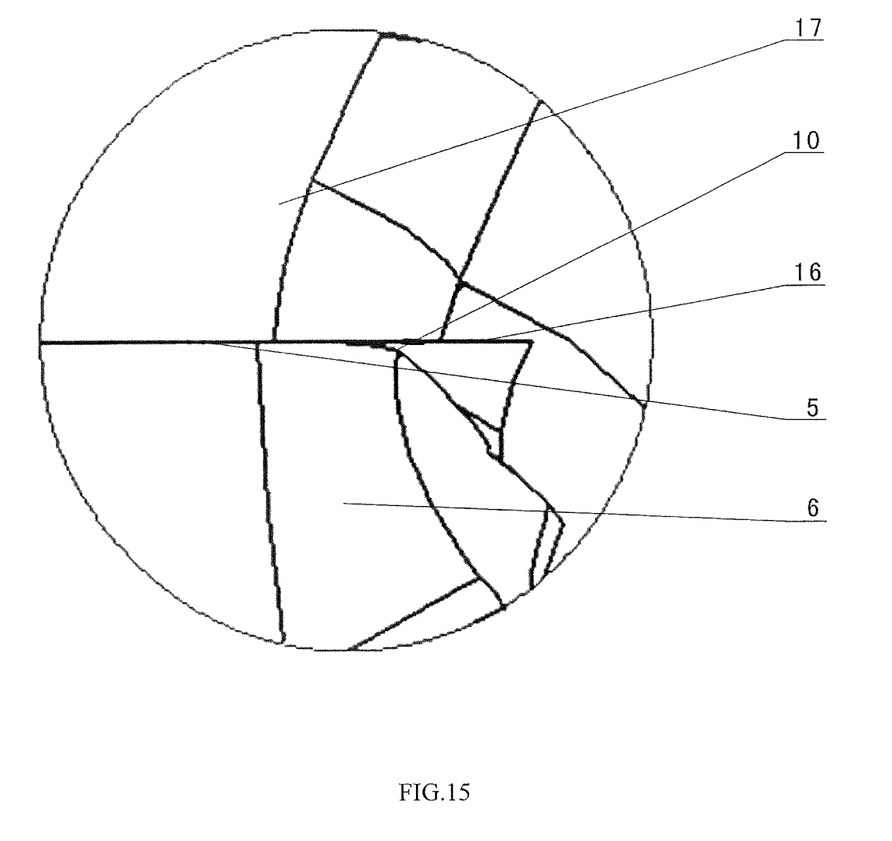
FIG. 15 is an enlarged view of 'F' in FIG. 14.

As shown in FIG. 1, FIG. 8, FIG. 9, and FIG. 12 to FIG. 15, during assembly, firstly the cylinder (1) at the lower part of the cutter head (6) is put in the cylinder holding slot (14) of the cutter shank (12), and the lower surface of the drilling body of the cutter head (6) is put on the upper end surfaces (20) of the cutter shank (12) in the position distal to the protrusions (17), and the cutter head ridge edges (10) are positioned on the inner side of the inner surfaces (16) of the protrusions (17); then the cutter head (6) is rotated clockwise using a loading/unloading tool (not shown in the figures) such that the cutter head ridge edges (10) are sequentially in non-contact fit, interference fit and non-interference fit with the inner surfaces (16) of the protrusions (17), the interference fit is depicted in FIG. 12 and FIG. 13, upon interference fit, the contact between the cutter head (6) and the cutter shank (12) is closest, resulting in a need for a large force for the transition toward non-interference fit; subsequently the cutter head (6) continues to undergo clockwise rotation such that the cutter head ridge edges (10) and the inner surfaces (16) of the protrusions (17) are in non-interference fit, and the clockwise rotation is stopped until the first cutter head contact faces (5) are in close contact with the inner surfaces (16) of the protrusions (17) and the second head contact faces (14) are in close contact with the first lateral surfaces (21) of the protrusions (17), in this procedure, the lower end surface of the drilling body of the cutter head (6) and the upper end surfaces (20) of the cutter shank (12) are always in contact. As shown in FIG. 14 and FIG. 15, the assembly of the cutter head (6) and the cutter shank (12) is completed. For disassembly of the drill, the cutter head (6) is rotated counter-clockwise using the loading/unloading tool, i.e., the cutter head (6) undergoes the reverse process to the foregoing, so that the cutter head ridge edges (10) and the inner surfaces (16) of the protrusions (17) are out of contact, as a result, the cutter head (6) and the cutter shank (12) are easily disassembled.

The foregoing descriptions of the embodiments have been presented by way of example only, and are not intended to limit the technical solutions of the invention. Based on the described exemplary embodiments, all other technical solutions obtained without creative labor shall fall into the protection scope of the present invention.

The invention claimed is:

1. A self-locking head-replaceable carbide drill, comprising a cutter head (6) and a cutter shank (12), in the view of a tip of the cutter head (6) being upward, an upper part of the cutter head (6) comprising a drill tip (7) and a drilling body positioned below the drill tip (7), the cutter head (6) being disposed at an upper side (19) of the cutter shank (12), a cylinder (1) being disposed at a lower part of the cutter head (6), the outer diameter of the drilling body of the cutter head (6) being larger than that of the cylinder (1), a vertical cylinder holding slot (14) or an cylinder holding hole being disposed at the upper side (19) of the cutter shank (12), and the cylinder (1) being mounted in the vertical cylinder holding slot (14) or the cylinder holding hole, characterized in that: at least two cutter head notches (9) are formed on the drilling body of the cutter head (6), each of the cutter head notches (9) is formed by intersecting a first cutter head contact face (5) and a second cutter head contact face (4) which are vertical or vertically oblique, the first cutter head contact faces (5) are more close to an vertical central line of the drilling body than the second cutter head contact faces (4), an side edge of each first cutter head contact face (5) distal to the corresponding second cutter head contact face (4) is bended towards the vertical central line of the drilling body to form a cutter head ridge edge (10), a first distance between each cutter head ridge edge (10) and the vertical central line of the drilling body is greater than an radial sectional radius of the cylinder (1), a vertical line segment exists in each first cutter head contact face (5), a second distance between the vertical line segment and the vertical central line of the drilling body is shortest between the first cutter head contact faces (5) and the vertical central line of the drilling body, at least two protrusions (17) which protrude upward are disposed on upper end surfaces (20) of the cutter shank (12) and correspond to each of the cutter head notches (9), inner surfaces (16) of the protrusions are positioned on outer sides of walls of the vertical cylinder holding slot (14) or the cylinder holding hole, and the protrusions have a structure that during the process of assembling the cutter head (6) and the cutter shank (12), the cutter head ridge edges (10) are sequentially in non-contact fit, interference fit, and non-interference fit with the inner surfaces (16) of the protrusions (17), and after the assembly is completed, the first cutter head contact faces (5) are in close contact with the inner surfaces (16) of the protrusions (17), and the second cutter head contact faces (4) are in close contact with first lateral surfaces (21) of the protrusions (17).

2. The self-locking head-replaceable carbide drill according to claim 1, characterized in that the cutter head notches (9) are two and symmetrical to each other relative to the vertical central line of the drilling body, the protrusions (17) are two and symmetrical to each other relative to the vertical central line of the drilling body, both the first cutter head contact faces (5) and the second cutter head contact faces (4) are a plane, the inner surfaces (16) and the first lateral surfaces (21) of the protrusions (17) are a plane, and the first distance between the two cutter head ridge edges (10) is slightly greater than a shortest distance between the inner surfaces (16) of the two protrusions (17).

3. The self-locking head-replaceable carbide drill according to claim 2, characterized in that a first included angle between each of the second cutter head contact faces (4) and an horizontal direction is 45°-90°, an upper portion of each second cutter head contact face (4) is more distal to the vertical central line of the drilling body of the cutter head (6) than a lower portion, and a second included angle between each of the first lateral surfaces (21) of the protrusions (17) and the horizontal direction is 45°-90°.

4. The self-locking head-replaceable carbide drill according to claim 3, characterized in that the first included angle between each of the second cutter head contact faces (4) and the horizontal direction is 65°, and the second included angle between each of the first lateral surfaces (21) of the protrusions (17) and the horizontal direction is 65°.

5. The self-locking head-replaceable carbide drill according to claim 4, characterized in that the cutter head ridge edges are arc-shaped edges.

6. The self-locking head-replaceable carbide drill according to claim 4, characterized in that two loading/unloading clamp slots for mounting a loading/unloading tool are disposed at an upper margin of the drilling body of the cutter head and in a position beside the two cutter head notches.

7. The self-locking head-replaceable carbide drill according to claim 4, characterized in that a drill point angle of the drill tip at the upper part of the cutter head is 140°.

8. The self-locking head-replaceable carbide drill according to claim 4, characterized in that cutter head spiral chip flutes are disposed on the cutter head, cutter bar spiral chip flutes are disposed on the cutter bar, wherein the cutter head spiral chip flutes and the cutter bar spiral chip flutes communicate with each other.

9. The self-locking head-replaceable carbide drill according to claim 3, characterized in that the cutter head ridge edges are arc-shaped edges.

10. The self-locking head-replaceable carbide drill according to claim 3, characterized in that two loading/unloading clamp slots for mounting a loading/unloading tool are disposed at an upper margin of the drilling body of the cutter head and in a position beside the two cutter head notches.

11. The self-locking head-replaceable carbide drill according to claim 3, characterized in that a drill point angle of the drill tip at the upper part of the cutter head is 140°.

12. The self-locking head-replaceable carbide drill according to claim 3, characterized in that cutter head spiral chip flutes are disposed on the cutter head, cutter bar spiral chip flutes are disposed on the cutter bar, wherein the cutter head spiral chip flutes and the cutter bar spiral chip flutes communicate with each other.

13. The self-locking head-replaceable carbide drill according to claim 2, characterized in that the cutter head ridge edges (10) are arc-shaped edges.

14. The self-locking head-replaceable carbide drill according to claim 2, characterized in that two loading/unloading clamp slots for mounting a loading/unloading tool are disposed at an upper margin of the drilling body of the cutter head and in a position beside the two cutter head notches.

15. The self-locking head-replaceable carbide drill according to claim 14, characterized in that a third included angle between bottoms of the loading/unloading clamp slots and the horizontal direction is 60°.

16. The self-locking head-replaceable carbide drill according to claim 2, characterized in that a drill point angle of the drill tip at the upper part of the cutter head is 140°.

17. The self-locking head-replaceable carbide drill according to claim 2, characterized in that cutter head spiral chip flutes are disposed on the cutter head, cutter bar spiral chip flutes are disposed on the cutter bar, wherein the cutter head spiral chip flutes and the cutter bar spiral chip flutes communicate with each other.

18. The self-locking head-replaceable carbide drill according to claim 17, characterized in that spiral angles of the spiral chip flutes is 25°.

* * * * *